United States Patent
Aaron

(10) Patent No.: US 6,311,721 B1
(45) Date of Patent: Nov. 6, 2001

(54) RESIDENTIAL DRAIN LINE STOP VALVE

(76) Inventor: William Aaron, 18910 San Juan, Detroit, MI (US) 48221

( * ) Notice: Subject to any disclaimer, the term of this patent is extended or adjusted under 35 U.S.C. 154(b) by 0 days.

(21) Appl. No.: 09/684,446

(22) Filed: Oct. 6, 2000

(51) Int. Cl.$^7$ .................................................. F16L 5/00
(52) U.S. Cl. ...................... 137/363; 137/362; 137/247.43
(58) Field of Search ............................... 137/362, 247.43, 137/363

(56) References Cited

U.S. PATENT DOCUMENTS

| | | | | |
|---|---|---|---|---|
| 1,962,978 | * | 6/1934 | Baldare | 137/362 |
| 2,725,112 | * | 11/1955 | Weisman et al. | 137/362 |
| 3,173,443 | * | 3/1965 | Saville | 137/362 |
| 4,167,358 | * | 9/1979 | Besha | 405/87 |
| 4,417,598 | * | 11/1983 | DePirro | 137/2 |
| 4,458,721 | * | 7/1984 | Yie et al. | 138/93 |
| 4,562,860 | * | 1/1986 | Walter et al. | 137/454.6 |
| 4,605,036 | * | 8/1986 | Smith et al. | 137/327 |
| 4,763,510 | * | 8/1988 | Palmer | 73/40.5 R |
| 5,035,266 | * | 7/1991 | Benson et al. | 138/92 |
| 5,333,649 | * | 8/1994 | Shimokawa et al. | 138/89 |
| 5,401,114 | * | 3/1995 | Guggemos | 404/25 |
| 5,413,136 | * | 5/1995 | Prescott | 137/68.3 |
| 5,525,007 | * | 6/1996 | Jones et al. | 405/52 |
| 5,560,388 | * | 10/1996 | Caldwell | 137/15 |
| 5,740,830 | * | 4/1998 | Mankins | 137/15 |
| 5,918,638 | * | 7/1999 | Davis | 138/89 |
| 5,969,234 | * | 10/1999 | Weigele | 73/40.5 R |
| 6,089,254 | * | 7/2000 | Kortmann | 137/312 |
| 6,125,878 | * | 10/2000 | Watts | 137/315.41 |
| 6,131,604 | * | 10/2000 | Hariss | 137/363 |
| 6,135,140 | * | 10/2000 | Grandinetti | 137/362 |

* cited by examiner

Primary Examiner—A. Michael Chambers
Assistant Examiner—Thomas L. McShane
(74) Attorney, Agent, or Firm—Rader, Fishman & Grauer, PLLC

(57) ABSTRACT

A resilient, deformable sewage back flow stop plug is disclosed that may be comformably compressed within a junction between a structure sewage effluent line and a sewer main. The plug is sized such that, when compressed, it deforms and conformably seals all access conduits to the structure sewage effluent line/sewer main junction. The plug may be deformed around any debris and/or sewage deposits located within the junction, conforming to fill and seal all access conduits and preventing the back flow of sewage into the structure.

13 Claims, 5 Drawing Sheets

RESIDENTIAL DRAIN LINE STOP VALVE

FIELD OF THE INVENTION

The present invention relates to an in-line valve assembly, and more specifically to a stop plug valve assembly for preventing sewage and waste fluid back flow from a city sewer main into a structure.

BACKGROUND

The collection of waste fluids in sewers has promoted and expanded urbanized industrial society by permitting increasingly larger collections of people to live within close proximity of one another. Conventionally, sewage and waste fluids are transported from a residential or commercial structure into the city's sewer network via gravity flow, usually by locating the sewer main further beneath ground surface than the sewage effluent lines of the structures that feed it. Where the land surface topography makes this impossible, a lift station or the equivalent must be added within the network to generate a flow-inducing hydraulic gradient. Once in the sewer network, the waste fluid is transported through increasingly larger sewer mains to an outflow location, typically a wastewater treatment facility. While such a system provides a simple and efficient method of removing waste fluids from the structures of an urban community, the necessity of open lines in a gravity-driven flow network creates the possibility of sewage back flow. That is, under certain conditions, the sewage flow direction can be reversed, causing sewage to flow from the sewer main into the structures intended to feed it, resulting in the deposition of sewage and waste fluids within the lower levels of residential homes and commercial buildings. Such an occurrence often results in significant property damage and may additionally pose a serious human health hazard. Consequently, devices have been designed to allow flow directed from the structure to the city sewer, but to prevent return flow from the sewer main into the structure.

Most commonly, such devices are employed during periods of heavy rain, because most municipalities do not maintain separate storm and sanitary sewer lines. Thus stormwater runoff is often channeled through the sanitary sewer lines. During heavy periods of rain, stormwater runoff accumulates upon surfaces, such as parking lots and roadways, through which it cannot infiltrate. These surfaces are often designed to channel runoff into a gutter leading to entryways into the city's sewer network. Stormwater runoff additionally enters the sewer main through the manholes that allow repair technician access. If sufficient in intensity and duration, heavy rains can result in the influx of fluids into the sewer network that is greater than the maximum flowrate capacity of the sewer mains. The fluid level in the sewer main then rises, potentially up to street level via the manhole access risers. Once the fluid level in the sewer network elevates above the sewage effluent lines of the structures that feed it, the hydraulic gradient reverses and gravity forces fluid to flow from the sewer main into the feed lines.

As stated above, various types of sewage back flow prevention devices have been created to guard against such occurrences. One common solution involves the installation of a one-way valve or flap within the structure sewage effluent line. An example is shown in U.S. Pat. No. 5,234, 018, issued to Grachal et al. The Grachal et al. device uses a hinged flap that seats against a lip on the structure sewage effluent line. During normal operation, the pressure of the gravity-driven sewage outflow against the flap causes it to swivel to an open position, allowing the outflow to enter the sewer main. However, when the hydraulic gradient reverses and the sewage flow direction changes, the flap is forced against the lip of the structure effluent line, which prevents it from swiveling and effectively seals the structure off from the sewer network. Unfortunately, however, this type of device often becomes clogged with debris and/or sewage deposits and fails to seal properly when the flow reverses, thereby permitting passage of waste fluid back into the feed line. Furthermore, this type of device cannot be manually actuated, and instead only becomes functional by the action of the sewage back flow itself.

Another method conventionally used to prevent sewage back flow involves the installation of a valve between the structure sewage effluent pipe and the sewer main. An example is shown in U.S. Pat. No. 5,775,365, issued to Hayden et al. The Hayden et al. device includes the use of a ball valve between the sewer main and the structure sewage effluent line. By closing the valve, the structure's sewage line can be sealed from the rest of the sewer network, preventing waste fluid from entering the structure. Unlike the hinged flap, this type of device may be used anticipatorily. That is, the structure may be manually sealed from the sewer main at any time in anticipation of actual sewage back flow. However, this type of device likewise suffers from the same disadvantage that it may be rendered ineffective if the junction to the valve becomes clogged with debris and/or sewage deposits and fails to close properly, thereby permitting passage of waste fluid into the structure.

There is a need for a device which can be used anticipatorily to prevent the back flow of waste fluid from a sewer main into a structure, and can seal the structure from the sewer network even if debris and/or sewage deposits have accumulated in the system.

SUMMARY

Accordingly, the present invention overcomes the above-described disadvantages by providing a resilient, deformable sewage back flow stop plug which may be comfortably compressed within the junction between the structure sewage effluent line and the sewer main. The plug is sized such that, when compressed, it deforms and conformably seals all access conduits to the structure sewage effluent line/sewer main junction. The plug may be deformed around any debris and/or sewage deposits located within the junction, conforming to fill and seal all access conduits and preventing the back flow of sewage into the structure.

BRIEF DESCRIPTION OF THE DRAWINGS

A number of features and advantages of the present invention will become apparent from the detailed description of the invention that follows and from the accompanying drawing, wherein.

DETAILED DESCRIPTION OF THE DRAWINGS

Figure 1:
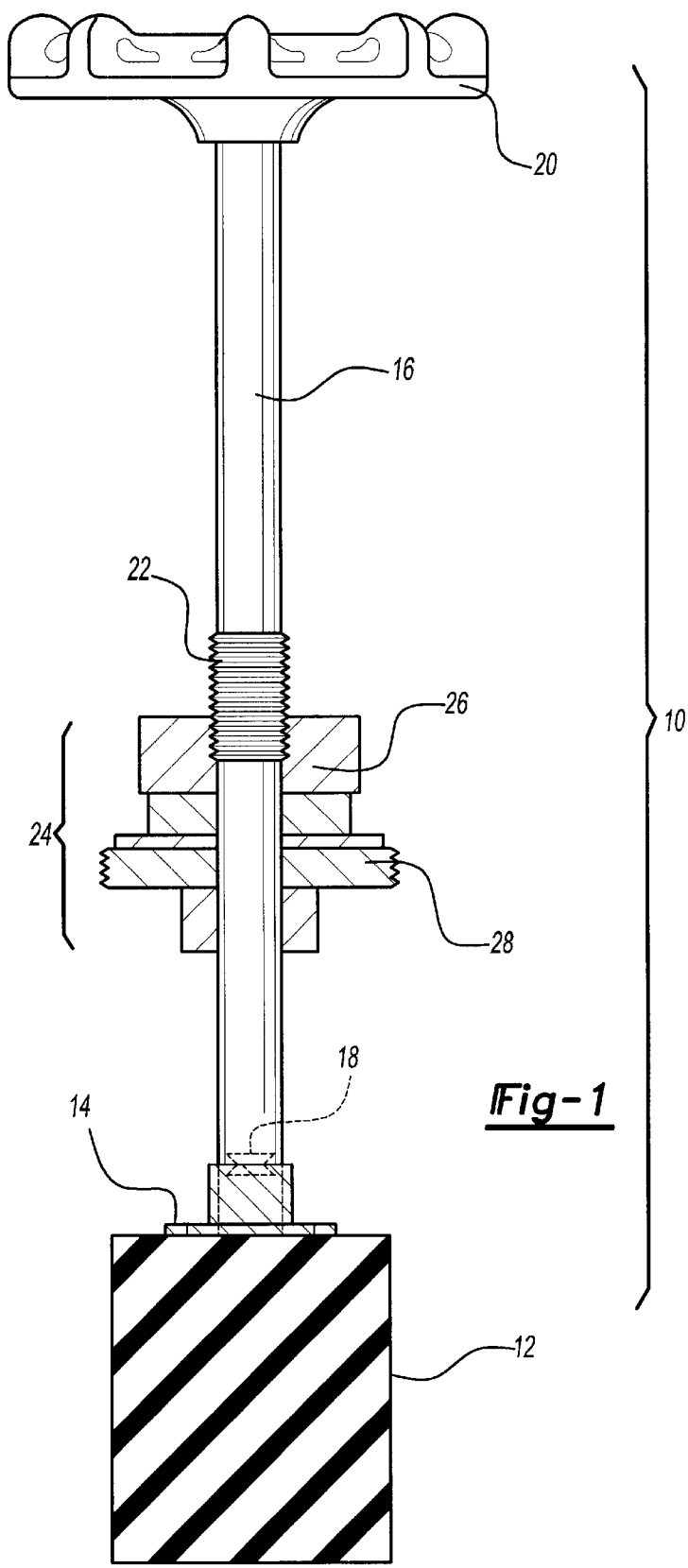
FIG. 1 is a cross sectional view of a first embodiment of a stop plug assembly.

A stop plug assembly 10 is shown in FIG. 1, including a deformable stop plug 12 attached at one end to a connecting rod 16, with a turn handle 20 attached at the other end of the rod, and an attachment assembly 24 attached to an intermediate portion of the rod for sealingly mating the stop plug assembly to a pipe junction that connects a structure sewage effluent line to a sewer main.

Stop plug 12 may be attached to rod 16 in a variety of ways, including chemical and/or adhesive bonding, the use of mechanical fasteners and/or fastening devices, or by molding stop plug 12 directly onto rod 16. In one embodiment, best illustrated in FIGS. 1 and 3, a rod attachment bracket 14 is chemically or adhesively bonded to stop plug 12. The use of an attachment bracket provides more bonding surface area than if rod 16 were attached to stop plug 12 directly. Rod attachment bracket 14 is attached to rod 16 with a fastener 18, which, likewise, can be any of a variety of fastening mechanisms. In a preferred embodiment, fastener 18 is a swivel-type joint that allows free rotation of rod 16 when stop plug 12 is inserted within the structure effluent line/sewer main junction. In a second embodiment, best illustrated in FIGS. 4 and 5, stop plug assembly 10 includes a plug rod section 15 attached to a plug compressing plate 17. Plug rod section 15 and plug compressing plate 17 may be attached to one another via chemical or adhesive bonding, mechanical fasteners and/or fastening mechanisms, or may be injection molded as a single piece. Stop plug 12 is then molded directly onto plug compressing plate 17 and at least a portion of plug rod section 15. Plug rod section 15 is attached to rod 16 via fastener 18. At least one eyelet 19 may also be formed or affixed to the plug adjacent the rod 16. Eylet 19 assists with removal of the plug in the event that the plug becomes separated from the rod, by providing an attachment point for a hook or similar device to remove the plug from a pipe junction.

Figure 2:
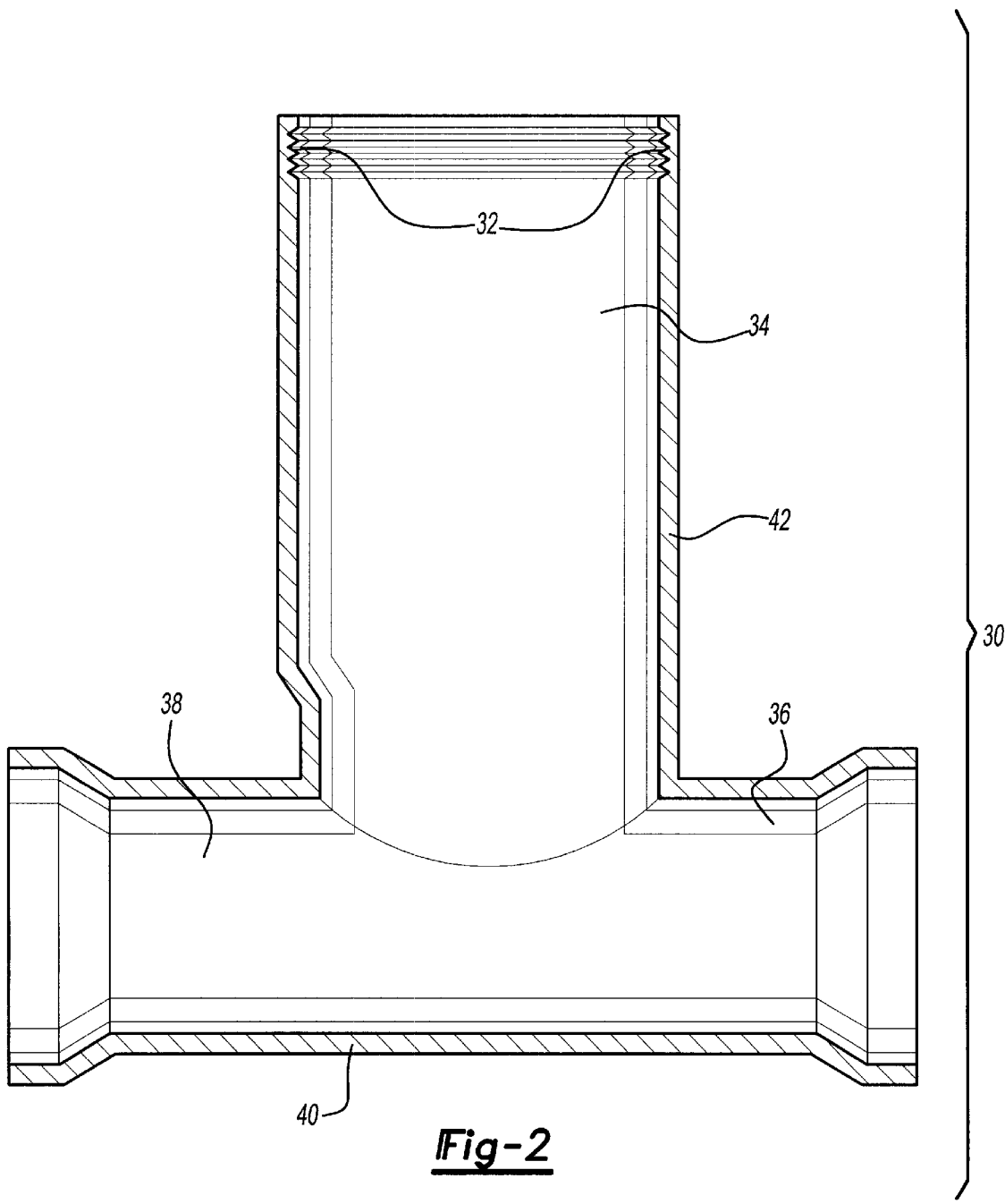
FIG. 2 is a cross sectional view of the structure effluent line/sewer main junction.

As shown in FIGS. 1 and 2, rod 16 terminates in a turn handle 20 and includes a threaded middle portion 22. Threaded middle portion 22 of rod 16 can be rotationally driven through corresponding inner threads (not shown) in attachment assembly 24. Attachment assembly 24 further includes an outer threaded circumference 28 which may be engagingly mated with corresponding threads 32 in the structure effluent line/sewer main junction 30 (FIG. 2). Junction 30 typically joins three conduits: stop plug conduit 34, wherein stop plug assembly 10 can be inserted and advanced to seal junction 30; sewer main conduit 36, which is an access conduit to the city sewer main; and structure effluent line conduit 38, which is an access conduit to the structure sewage line.

Figure 3:
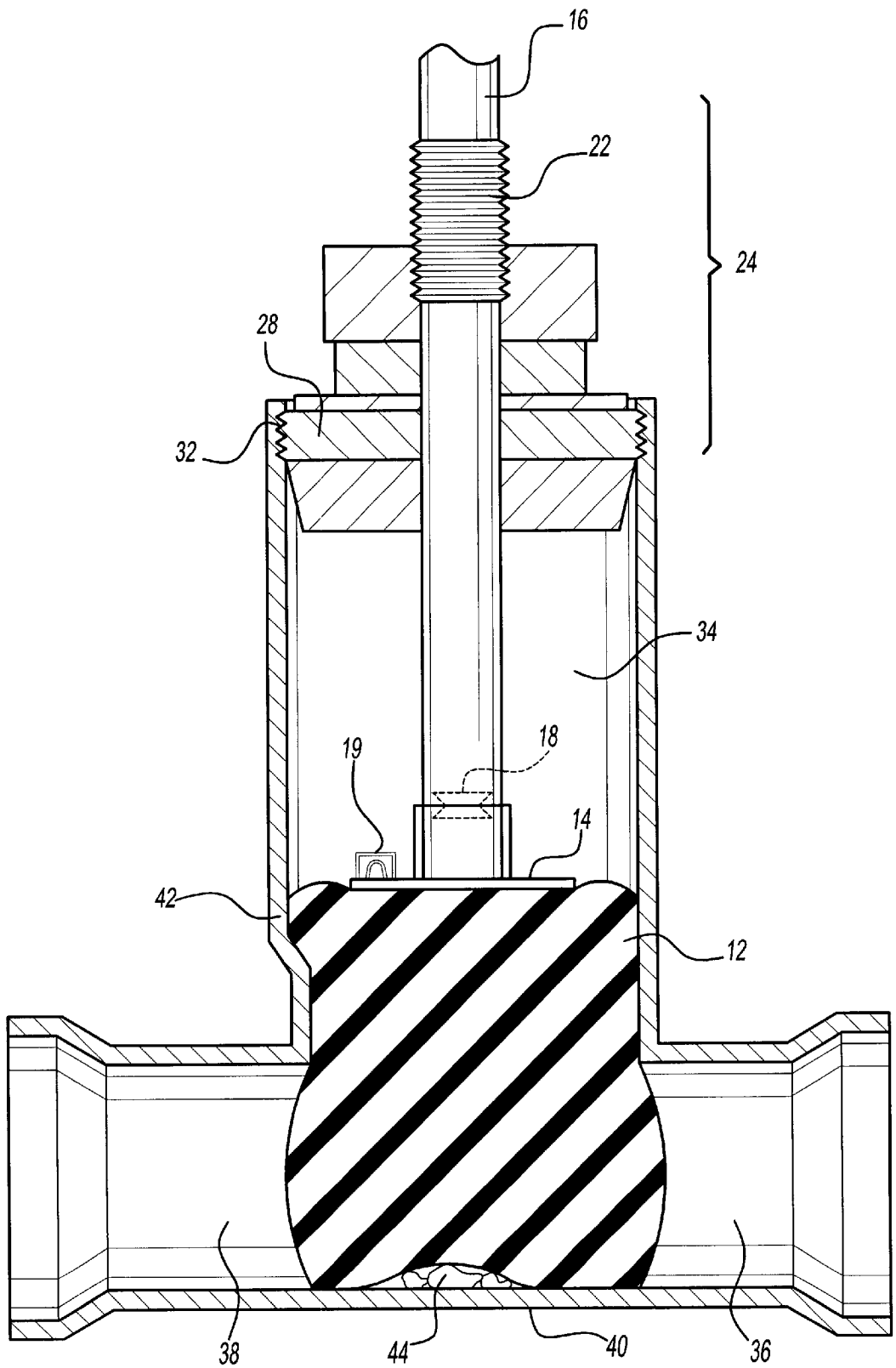
FIG. 3 is a cross section view of the structure effluent line/sewer main junction with a stop plug assembly compressedly inserted therein.
Figure 4:
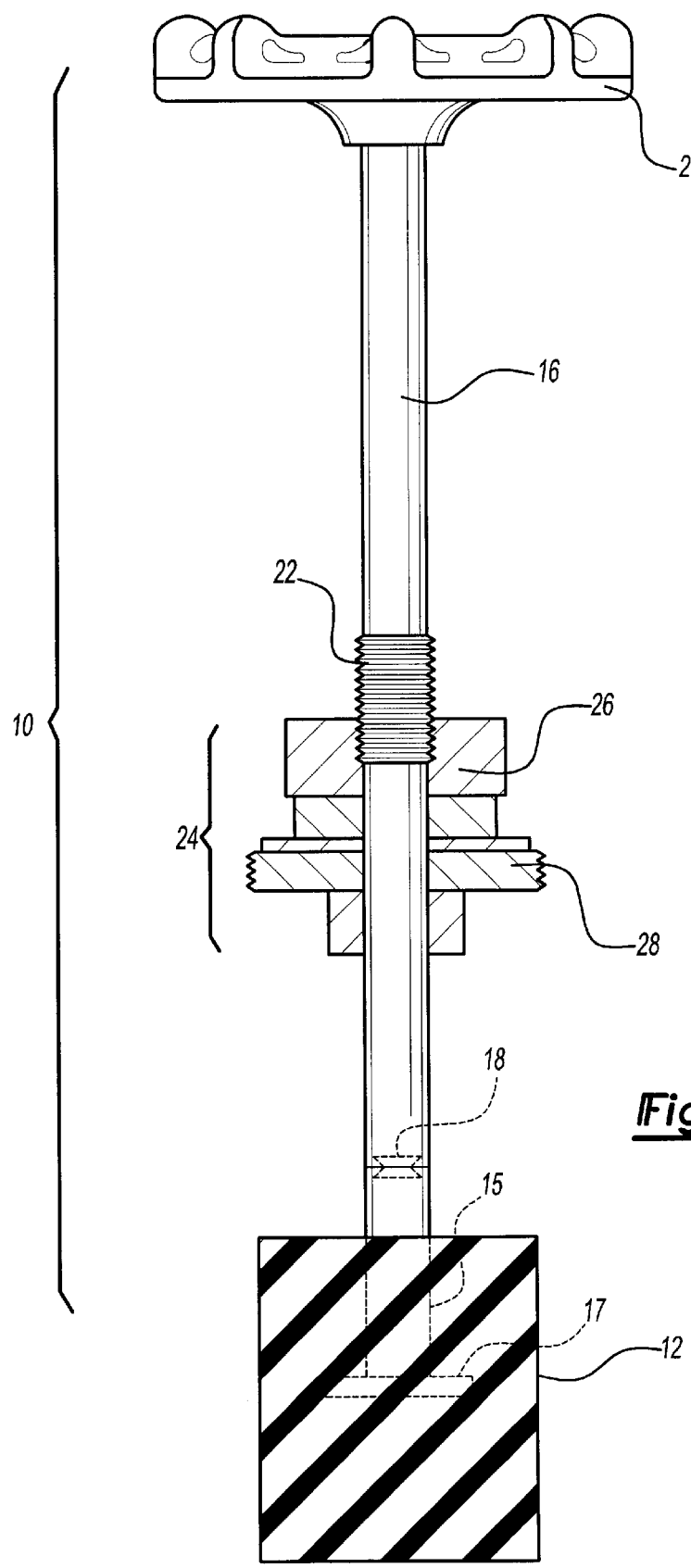
FIG. 4 is a cross sectional view of a second embodiment of a stop plug assembly.
Figure 5:
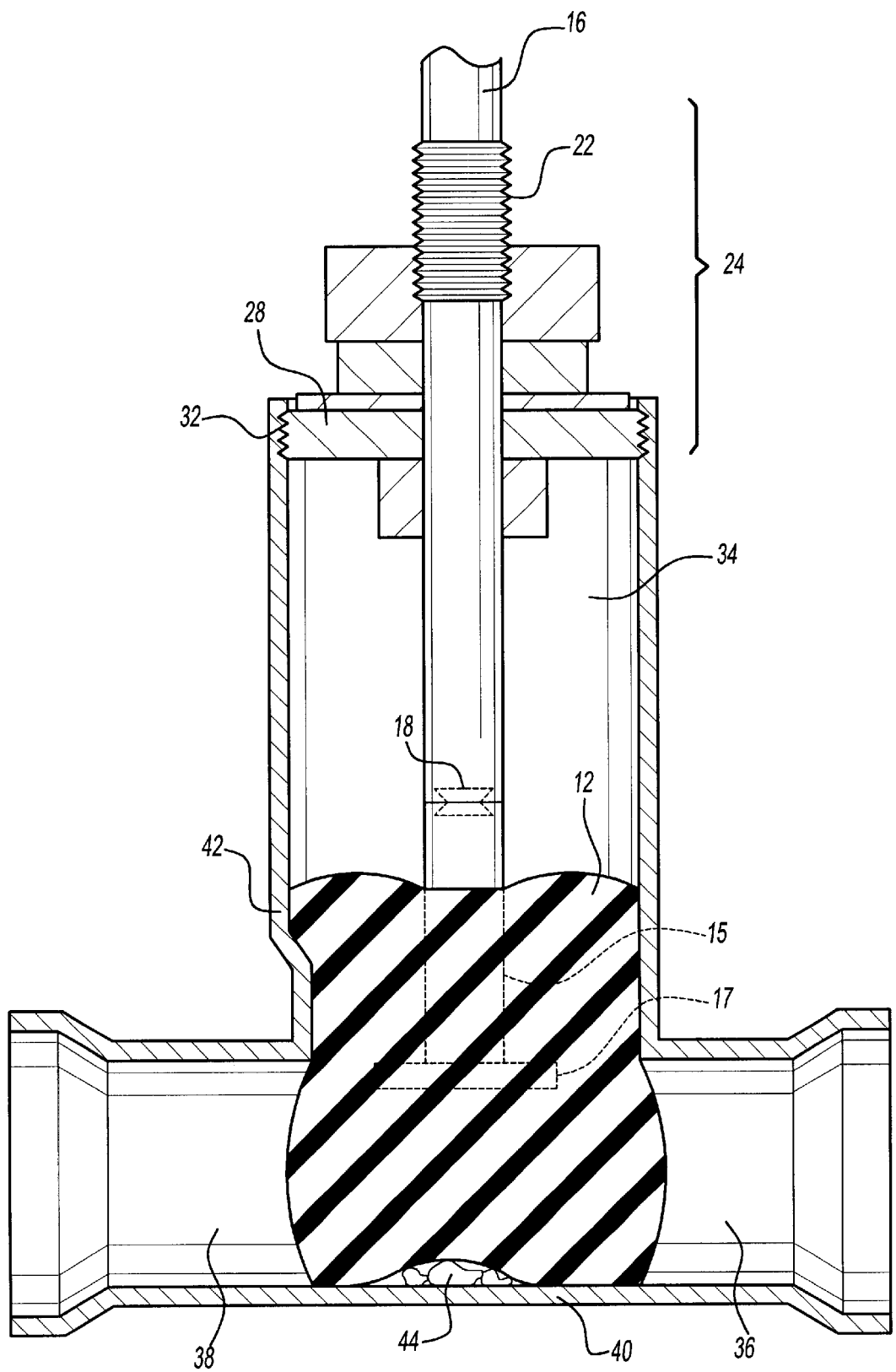
FIG. 5 is a cross section view of the structure effluent line/sewer main junction with the stop plug assembly compressedly inserted therein.

FIGS. 3 and 5 depict the stop plug assembly inserted to seal the structure and prevent back flow from the sewer main to the structure should the hydraulic gradient reverse. For purposes of illustration, deformation of the stop plug may be exaggerated in FIGS. 3 and 5. Employing and rotating turn handle 20 also rotates rod 16. The rotational action of rod 16 causes threads 22 to be drawn into attachment assembly 24. Of course, the axial extent of the threads 22 is limited only by the length of the rod 16, and the assembly 24 may axially extend as far as necessary to adequately support and prevent lateral deflection of rod 16. As the rod 16 is drawn into attachment assembly 24, the stop plug assembly 10 is rotationally advanced into junction 30, until plug 12 comes into contact with the bottom surface 40 of junction 30. At that point, additional rotation of turn handle 20 exerts a downward force on the plug, causing it to compress against the bottom surface 40 of junction 30. Under such force, plug 12 deforms and exert pressure against both the bottom surface 40 and sidewall 42 of junction 30. Rod attachment bracket 14, in the first embodiment, and plug compressing plate 17, in the second embodiment, distribute the downward pressure produced by additional rotation of turn handle 20, shaping the plug to fit the junction and produce a watertight seal in all directions. In the event that debris 44 rest in junction 30, plug 12 simply conforms around the debris, so that the debris will not adversely impact the integrity of the seal formed when the plug is compressed. Watertight integrity within the junction requires only that the plug conform and seal along any one transect across the junction. However, the size and deformability of the plug allow for such a seal to form at a plurality of locations within the junction. Additionally, the present invention retains the advantage that the structure sewage effluent line may be anticipatorily sealed from the sewer main.

Although certain preferred embodiments of the present invention have been described in detail, many physical changes could be made to the apparatus without altering the inventive concepts and principles embodied therein. The invention is not to be limited to the illustrations described and shown herein, which are deemed to be merely illustrative of the best modes of carrying out the invention. A person of ordinary skill in the art will realize that certain changes and modifications will come within the teachings and range of equivalency of the invention and that such changes and modifications are within its spirit and the scope as defined by the claims.

What is claimed is:

1. An assembly for preventing sewer backflow, comprising:
   a three-way pipe junction having an inlet and an outlet and an access;
   a rod removably inserted through said access, wherein a first end of said rod includes a bracket; and
   a compressible plug attached to said bracket of said rod, said compressible plug sized to conformably seal said junction when inserted therein.

2. The assembly of claim 1, wherein said rod first end includes a swivel joint adjacent said bracket.

3. In a sewer junction having an inlet, an outlet and an access to the junction, a removable sewer stop valve, comprising:
   an elongated rod, a first end of said rod inserted through said access and extending at least to the inlet and outlet, an exterior intermediate portion of said rod including a first set of threads, wherein said first end includes a bracket;
   an attachment cover received in said access, said cover having an aperture axially therethrough for threadedly receiving said rod; and
   a compressible plug attached to said bracket of said rod, said plug movable from an open position to a closed position upon selective rotation of said rod in said cover, said plug having an axially length sized to cover said inlet and said outlet when in said closed position.

4. The removable valve of claim 3, wherein said rod first end includes a swivel joint adjacent said bracket.

5. A stop plug assembly comprising:
   a deformable plug sized to conformably seal within a pipe junction when inserted therein; and
   a plug positioning assembly, said assembly further comprising:
      a connector fixedly joined to said plug;
      a rod with first and second ends and a threaded middle portion, said plug connector attached to said first end of said rod by a swivel connector;

a turn handle attached to said second end of said rod;

an end cap for attaching to an access to said junction, said cap sealingly engaging said access and having a threaded aperture therethrough for matingly receiving said rod middle portion, wherein said stop can be rotationally advanced or retracted within said pipe junction and compressed to conformingly seal said pipe junction by rotating said turn handle.

6. The removable valve of claim 5, wherein said plug further includes at least one eyelet adjacent said rod to assist removal of said plug.

7. An assembly for preventing sewer backflow, comprising:

a three-way pipe junction having an inlet, an outlet and an access;

a rod removably inserted through said access, wherein a first end of said rod includes a radially extending plate; and a compressible plug molded around said plate to attach said plug to said rod, wherein said compressible plug is sized to conformably seal said, junction when inserted therein.

8. The assembly of claim 7, wherein said rod first end includes a swivel joint adjacent said plug.

9. The assembly of claim 8, wherein said plug further includes at least one eyelet adjacent said rod to assist removal of said plug.

10. In a sewer junction having an inlet, an outlet and an access to the junction, a removable sewer stop valve, comprising:

an elongated rod, a first end of said rod inserted through said access and extending at least to the inlet and outlet, an exterior intermediate portion of said rod including a first set of threads, wherein said first end includes a radially extending plate;

an attachment cover received in said access, said cover having an aperture axially therethrough for threadedly receiving said rod; and a compressible plug molded around said plate for attachment to said rod, said plug movable from an open position to a closed position upon selective rotation of said rod in said cover, said plug having an axially length sized to cover said inlet and said outlet when in said closed position.

11. The removable valve of claim 10, wherein said rod first end includes a swivel joint adjacent said plug.

12. The removable valve of claim 11 wherein said plug further includes at least one eyelet adjacent said rod to assist removal of said plug.

13. The removable valve of claim 10, wherein a second end of said rod includes a turn handle, such that selective rotation of said turn handle moves said plug from said open position to said closed position.

* * * * *